United States Patent [19]

Adams

[11] Patent Number: 5,077,882

[45] Date of Patent: Jan. 7, 1992

[54] METHOD FOR REBORING A HOUSING

[76] Inventor: Dale R. Adams, 145 West Aurora Rd., Northfield, Ohio 44067

[21] Appl. No.: 629,154

[22] Filed: Dec. 18, 1990

Related U.S. Application Data

[60] Division of Ser. No. 519,879, May 7, 1990, Pat. No. 4,997,321, which is a continuation of Ser. No. 301,244, Jan. 24, 1989, abandoned.

[51] Int. Cl.$^5$ .............................................. B23P 6/00
[52] U.S. Cl. .................................. 29/402.06; 29/402.11
[58] Field of Search ............... 29/26 A, 26 B, 26 R, 29/402.01, 402.06, 402.07, 402.09, 402.11, 402.16, 402.19; 82/1 B, 1.2; 408/67, 75, 80, 82, 102, 200, 79

[56] References Cited

U.S. PATENT DOCUMENTS

| | | | |
|---|---|---|---|
| 2,956,456 | 10/1960 | Bisceglia et al. | 82/1.2 X |
| 3,191,463 | 6/1965 | Ladendorf | 408/200 |
| 4,197,041 | 4/1980 | Prewitt | 408/102 |
| 4,339,857 | 7/1982 | Dickinson | 408/67 X |
| 4,548,530 | 10/1985 | Weibler | 408/79 |
| 4,571,795 | 2/1986 | Shieto | 29/26 B |
| 4,932,814 | 6/1990 | York | 29/26 B X |
| 4,969,246 | 11/1990 | Shieto | 29/402.11 X |

Primary Examiner—Joseph M. Gorski
Assistant Examiner—Peter Dungba Vo
Attorney, Agent, or Firm—Renner, Kenner, Greive, Bobak, Taylor & Weber

[57] ABSTRACT

Apparatus for reboring a damaged portion in the first of first and second bores (15, 14) in a counterbored workpiece (12) contemplates a first pilot (35) for extending through the second bore and engaging the first bore interiorly, a cylinder (41) for supporting and axially driving the first pilot and the workpiece, a second pilot (55) for engaging the first bore exteriorly, a cylinder and motor (52) for supporting an axially driving the second pilot in opposed relation to the cylinder for supporting and axially driving the first pilot, and a boring device (53) for supporting and axially driving the second pilot for reboring a damaged portion of the first bore. The method for repairing the bore of the workpiece includes the steps of mounting the workpiece on the first pilot engaging the first bore interiorly of the damaged portion, positioning the second pilot for engaging the first bore exteriorly of the damaged portion, driving the first and second pilots into closer positioning to effect concentric alignment of the first bore in the workpiece with the first and second pilots, simultaneously moving the first and second pilots to clamp the workpiece against a fixed plate while maintaining the concentric alignment of the first bore with the first and second pilots, disengaging the second pilot from the extremity of the first bore of the workpiece, and inserting a boring device into the extremity of the first bore for reboring the damaged portion thereof.

8 Claims, 3 Drawing Sheets

METHOD FOR REBORING A HOUSING

This application is a division of application Ser. No. 07/519,879, filed May 7, 1990, now U.S. Pat. No. 4,997,321, which is a continuation of application Ser. No. 07/301,244 filed Jan. 24, 1989, now abandoned.

TECHNICAL FIELD

Generally, the invention relates to a method and apparatus for repairing damaged bores in a housing or the like. More particularly, the invention relates to a method and apparatus for repairing a damaged bore in a housing or the like in concentricity with an original bore. More specifically the invention relates to a method and apparatus for aligning, clamping, and reboring a housing or the like in concentricity with an original bore which has been damaged preparatory to the insertion of a sleeve in the damaged portion of the bore having interval dimensions identical to the dimensions of the original bore.

BACKGROUND ART

There are various industrial applications where a workpiece has a throughbore which is formed by two counterbores where one of the bores may be particularly subject to wear. Such excessive wear may be brought about by the material that the workpiece is made of or the action of whatever operative components work in the bore or a combination of these and perhaps other factors. Particularly in regard to workpieces which may be complexly configured such that the original manufacturing may make the workpiece relatively expensive, it is highly desirable if a damaged bore in an otherwise usable workpiece can be repaired or in some manner reconditioned.

One such device of this type exists in the automotive field in the form of the main housing for many power rack and pinion steering assemblies. The power rack and pinion steering housing as manufactured by or for several automotive manufacturers consists of an elongate, irregularly shaped housing which seats a spool valve having a plurality of peripheral grooves which interact with a plurality of ports in the housing. Since the housing is constructed of aluminum for weight reduction purposes the pressurized fluid in the spool valve grooves eventually forms score lines or recesses in the housing. At some point in time the score lines become sufficiently pronounced such that fluid leakage between the various spool valve grooves takes place to an extent that the operation of the power assist to the steering mechanism is adversely affected.

Due to the significant costs involved in replacement of the entire housing, efforts are being made in the vehicle repair industry to recondition or rebuild the housings. The housings are generally an elongate member for receiving a shaft having the grooved spool valve at one end and a fluted gear near the opposite end for engaging a rack. The bore for the shaft is counterbored from both ends with one bore designed to receive the spool valve and supporting bushings, bearings and seals and the other end accommodating the fluted gear portion of the shaft. As a basic manufacturing technique a pair of counterbores are made to receive these two portions of the shaft. According to standard manufacturing techniques the two bores in the counterbored housing are not necessarily exactly concentric. Any effort to rebore or to rebore and fit the bore housing the spool valve with a metallic sleeve necessarily contemplates that the rebore be made with a reamer which is exactly concentrically aligned with the original bore. If this alignment is not achieved, the shaft or rod mounting the spool valve will be misaligned with and therefore bind in the associated bushings and bearings on which it rides. Even minor misalignment produces a defective power steering unit which cannot be used successfully as a replacement part.

As a result various attempts have been made to devise a method and apparatus for reboring such steering housings with concentric alignment achieved to within the requisite tolerances of approximately one half a thousandths of an inch. For the most part these efforts at repairing the housings by reboring and inserting a sleeve have proven to be costly in terms of requiring a substantial amount of time of skilled machinists and proving difficult to maintain within required tolerances, thus producing numerous scrap parts or rebuilt parts with marginal operating parameters.

One approach to endeavoring to rebore such housing involves utilization of the original tooling which was employed to hold the housing to make the original bore comply with use of a larger reamer. It is believed that this has proved to be largely unsuccessful evidently for the reasons that variations in different versions of the same tooling and variations in the outer dimensions of the housing are of a sufficient magnitude such that the requisite precision in achieving concentric alignment with the original bore cannot be repeatedly achieved. Thus, the concept of reprocessing damaged housings on the original tooling has not achieved wide acceptance.

Another approach which has been employed to some extent involves the attempted processing of the power steering housings on a conventional boring machine. In this instance the two ends of the housing, i.e., the counter bore openings, are aligned and then the housing is retained while an enlarged rebore is done at the end having the bore housing the spool valve. This approach presumes that the two counterbores are exactly concentrically aligned; however, it is to be noted that the two bores are not in fact concentrically aligned in the actual housings which are manufactured. Therefore, the error by way of initial misalignment of the bores is coupled with whatever error may exist by way of effecting the aforesaid end to end alignment. For these reasons substantial difficulties have been encountered in endeavoring to locate and effect rebore on conventional milling machines.

To applicant's knowledge no method and apparatus have been devised which will obviate the above discussed problems of achieving sufficient accuracy in the reboring of non-aligned counterbores in a workpiece to quickly and repeatably effect precision reboring for extremely close tolerance applications. The aforedescribed methods and apparatus not only fail to achieve sufficient precision in a large number of instances but also tend to be slow and time consuming, thus increasing the cost of endeavoring to repair workpieces of this type.

DISCLOSURE OF THE INVENTION

Therefore an object of the invention is to provide a method and apparatus for effecting the precision repair of damaged bores in a housing or other workpiece. Another object of the present invention is to provide such a method and apparatus which effects aligning, clamping and reboring of a housing or the like with a bore which is in highly accurate concentricity with an original bore which has been damaged. Still another object of the present invention is to provide such a method and apparatus wherein the boring tool is concentrically aligned with the bore of the housing or workpiece which is to be rebored and particularly by predicating alignment upon two substantially spaced points within the damaged bore which is to be rebored such that the boring tool is necessarily accurately concentrically aligned with the original bore.

Another object of the present invention is to provide a method and apparatus for effecting precision repair of damaged bores in a housing which assures that the rebore of the damaged bore is concentric with the original bore irrespective of whether the original bores are concentric and the extent of departure from concentricity. Still another object of the present invention is to provide such a method and apparatus which permits rebore accuracy relative to an original bore within a fraction of a thousandths of an inch. Still another object of the invention is to provide such a method and apparatus which quickly and accurately aligns and clamps workpieces for reboring employing conventional boring machine techniques.

Yet another object of the invention is to provide a method and apparatus for effecting the precision repair of damaged bores in a housing wherein aligning and positioning elements are arranged and configured such that a lubricating coolant is directed axially toward the tip of a reamer or other boring element so as to continually flush chips and particles away from the boring element and to temperature stabilize the housing, thereby producing a uniform good quality precision finish rebore. Still another object of the present invention is to provide such a method and apparatus which are readily adaptable to boring housings or other workpieces having similar but somewhat differing dimensions or configurations by a relatively rapid and easy interchange of certain of the components which engage the housings. A still further object of the present invention is to provide such a method and apparatus which may be easily and safely operated by even unskilled operators with a minimum of experience and training. Still a further object of the invention is to provide such a method and apparatus which employs generally conventional components which are relatively inexpensive, easy to adjust, maintain and service, and readily accessible for such servicing, repair or replacement as may be required within relatively close time constraints.

In general, apparatus for reboring a damaged portion in the first of first and second bores in a counterbored workpiece includes a first pilot for extending through the second bore and engaging the first bore interiorly of the damaged portion, a cylinder for supporting and axially driving the first pilot and the workpiece, a second pilot for engaging the first bore exteriorly of the damaged portion, a cylinder and motor for supporting and axially driving the second pilot in opposed relation to the cylinder for supporting and axially driving said first pilot, whereby the first bore is concentrically aligned, and a boring device mounted on the cylinder and motor for supporting and axially driving the second pilot for reboring a portion of the first bore in the workpiece.

The method for repairing the bore of the workpiece includes the steps of mounting the workpiece on the first pilot engaging the first bore interiorly of the damaged portion, positioning the second pilot for engaging the first bore exteriorly of the damaged portion, driving the first and second pilots into closer positioning to effect concentric alignment of the first bore in the workpiece with the first and second pilots, simultaneously moving the first and second pilots to clamp the workpiece against a fixed plate while maintaining the concentric alignment of the first bore with the first and second pilots, disengaging the second pilot from the extremity of the first bore of the workpiece, and inserting a boring device into the extremity of the first bore for reboring the damaged portion thereof.

PREFERRED EMBODIMENT FOR CARRYING OUT THE INVENTION

Figure 1:
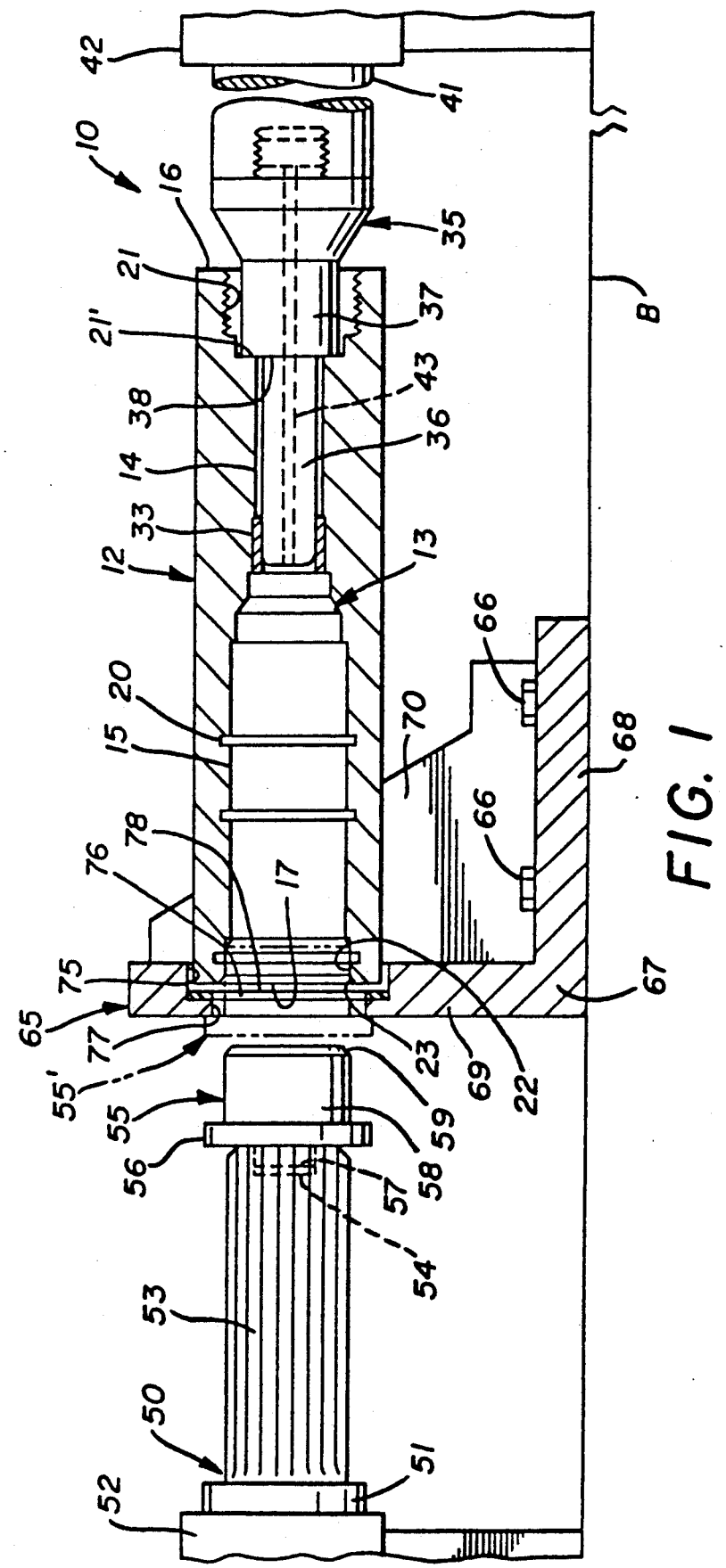
FIG. 1 is a side elevational view, partially in section and with some elements schematically depicted, of boring apparatus according to the concepts of the present invention showing a workpiece spaced from the faceplate and mounted on a pilot for aligning the workpiece for reboring in concentricity with an original bore.
Figure 2:
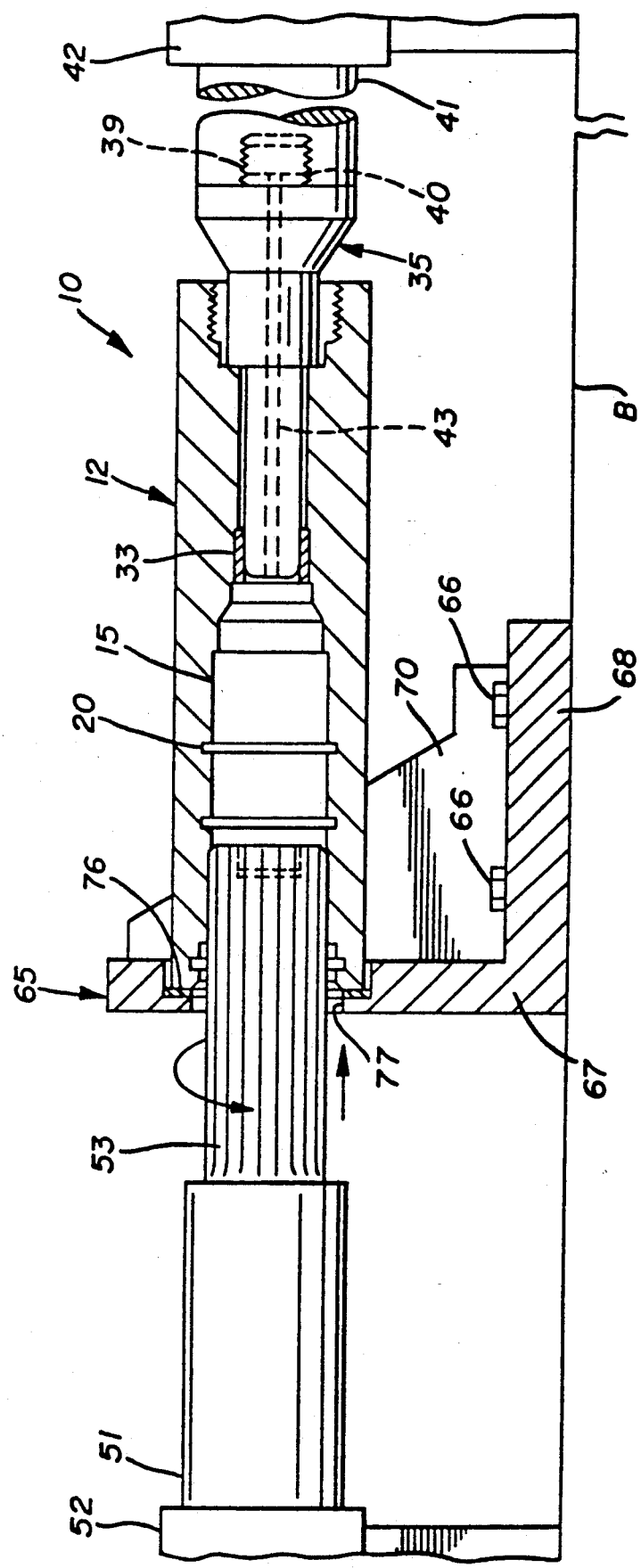
FIG. 2 is a view similar to FIG. 1 of the boring apparatus and workpiece of FIG. 1 showing the workpiece clamped against a fixed faceplate and being bored by a reamer.

Exemplary boring apparatus embodying the concepts of the present invention and for practicing the method of the present invention is generally depicted by the numeral 10 in FIGS. 1 and 2 of the drawings. While the boring apparatus 10 and the method may be employed in regard to a variety of applications where a workpiece has a throughbore formed by two counterbores and where at least one of the bores is subject to excessive wear, a single embodiment involving a bored housing, generally indicated by the numeral 12, is detailed hereinafter.

Figure 3:
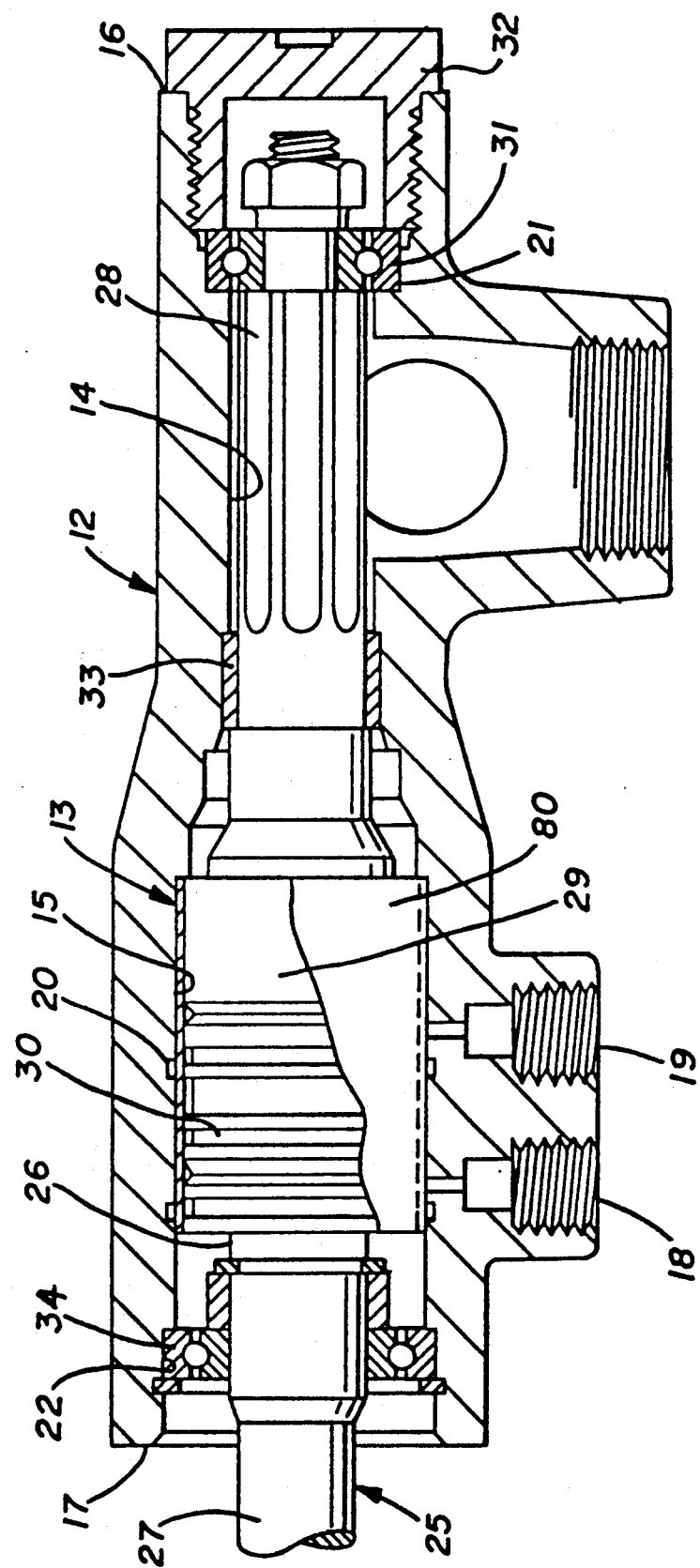
FIG. 3 is a sectional view showing details of the workpiece, subsequent to reboring with a repair sleeve positioned in the renewed bore and a conventional grooved spool valve positioned therein.

The depicted housing 12 is for a power steering rack and pinion assembly of a type commonly employed in vehicles for a number of years. As best seen in FIG. 3, the housing 12 is an elongate generally cylindrical member having a throughbore, generally indicated by the numeral 13. The throughbore 13 is formed by two intersecting counter bores, namely, a gear receiving bore 14 and a spool valve receiving bore 15 extending axially inwardly from end faces 16 and 17, respectively, of the housing 12.

Referring now to FIG. 3 of the drawings, operatively interrelated with the housing 12 to drive a rack (not shown) controlling the wheels of a vehicle is a pinion assembly, generally indicated by the numeral 25. The pinion assembly 25 includes an elongate shaft 26 which extends substantially the length of throughbore 13 with one extremity 27 extending outwardly of end face 17 of housing 12. The shaft 26 carries a fluted gear 28 which engages a rack (not shown) that controls the turning position of the front wheels of a vehicle. The fluted gear 28 is loosely housed within the gear receiving bore 14 of the throughbore 13.

Spaced a distance from the gear 28 the shaft 26 carries a spool valve 29 which is snugly housed in the spool valve receiving bore 15 of housing 12. The spool valve 29 has a plurality of spaced grooves 30 which cooperate with ports 18 and 19 in the housing 12 for the transfer of pressurized fluid. Since the housing 12 is commonly made of aluminum or other light weight metal which may be relatively soft, it is common for the spool valve receiving bore 15 to develop score lines or recesses 20. The recesses 20 eventually become sufficiently pronounced such that fluid leakage between the various grooves 30 of spool valve 29 takes place to an extent that the operation of the power assist for the steering mechanism is adversely affected or the power assist becomes totally inoperative.

The pinion assembly 25 has the shaft 26 supported at a plurality of locations along the throughbore 13 of the housing 12. Initially the shaft 26 is supported in the area proximate the gear 28 outwardly near the end face 16 of housing 12 by a bearing 31 which reposes in an enlarged entry bore 21 forming part of gear receiving bore 14. The entry bore 21 may be provided with an end plug 32 which maintains the bearing 31 in position within the gear end entry bore 21 of the housing 12. The spool valve receiving bore 15 mounts a bushing 33 which engages the shaft 26 in the extent which is located between the gear 28 and the spool valve 29. The extremity of the shaft axially outwardly of the spool valve is supported on a bearing 34 which is located in the spool valve entry bore 22 to spool valve receiving bore 15 proximate the end face 17 of the housing 12. It is to be appreciated that the supports for the shaft 26 may be varying combinations of bushings, bearings and other alignment and/or friction reducing surfaces depending upon the design of the housing 12, the shaft 26, the spool valve 29, and the gear 28, all as will be appreciated by persons skilled in the art.

The housing 12 is supported and partially aligned by an elongate pilot assembly, generally indicated by the numeral 35. The pilot assembly 35 has an elongate cylindrical nose 36 which extends through the gear receiving bore 14 and is diametrically sized to register with a cylindrical interior surface of the bushing 33 in spool valve receiving bore 15. In the event that a particular housing 12 might not have a bushing 33, an appropriate sized bushing may be inserted for purposes of temporarily supplying an alignment surface for the nose 36. The nose 36 of pilot assembly 35 extends from an enlarged cylindrical guide 37 which fits within the entry bore 21 of the throughbore 13. For reasons which will be appreciated later, the guide 37 is of such a diameter as to provide support for the housing 12 and maintain it roughly positioned on the pilot assembly 35 while being of a sufficiently smaller diameter such that it does not tend to accurately align the entry bore 21 relative to the guide 37.

The guide 37 has at its axially inner extremity an offset surface 38 which engages a shoulder 21' formed between bore 14 and bore 21 such that axial thrust applied to the guide 37 is transmitted to the housing 12 through the shoulder 21'. The extremity of the pilot assembly 35 opposite the nose 36 terminates in a threaded extension 39 which is received in a comparably threaded opening 40 in a shaft 41 of a pneumatic cylinder assembly 42 (FIG. 2). The pneumatic cylinder 42 may be any of a number of conventional designs which are well known to persons skilled in the art as providing axial displacement of a shaft 41 upon the application of pressurized fluid as directed by suitable controls. The sizing and operating parameters of the pneumatic cylinder 42 are discussed hereinafter. The cylinder 42 is equipped as might be required to supply a suitable cooling fluid to a duct 43 which extends axially the length of the pilot assembly 35 to selectively deliver cooling fluid out of the nose 36 internally of the throughbore 13.

Spaced a distance from and positioned in opposed relation to the pilot assembly 35 is a boring machine, generally indicated by the numeral 50. The boring machine 50 may be of conventional design and has a shaft 51 which is mounted in precise concentric alignment with the shaft 41 of the pilot assembly 35. A pneumatic cylinder assembly and motor 52 provide for the axial displacement of shaft 51, as well as the selective rotation of the shaft 51 for a purpose which will become apparent hereinafter. The shaft 51 mounts a reamer 53 which may be substantially of conventional design for purposes of effecting precision bores in metallic components. The reamer 53 is thus capable of being selectively moved axially as well as being rotated at selective times and at desired speeds by virtue of fixed mounting on the shaft 51 of pneumatic cylinder and motor assembly 52.

Mounted at the axial extremity of the reamer 53 opposite the shaft 51 is a removable pilot cap, generally indicated by the numeral 55. The pilot cap 55 is of a generally cylindrical configuration having a base plate 56 which abuts the nose or axial extremity of the reamer 53 for effecting alignment therewith. The reamer 53 has a bore 54 which receives a cylindrical projection 57 extending axially from the base 56 of the pilot cap 55 for selectively temporarily retaining the pilot cap 55 to the reamer 53. The pilot cap 55 may advantageously be held in place in part on the reamer 53 by a snug, precision fit between the projection 57 and the bore 54. Additionally, the nose of reamer 53 or the pilot cap 55, as in the area of base 56 or annular projection 57, may be provided with a magnetic insert (not shown) for supplementing the selective retention of pilot cap 55 on reamer 53.

The pilot cap 55 has extending from the base 56 a cylindrical projection 58. The cylindrical projection 58 is diametrically sized to register with the spool valve end entry bore 22 of the housing 12. For purposes of facilitating the gripping and handling of the pilot cap 55, the base 56 may advantageously be of a somewhat greater diameter than the projection 58 to facilitate the grasping of the pilot cap 55 to effect its removal and the insertion of the cylindrical projection 57 into the bore 54 of the reamer 53. Pilot cap 55 may have at the axial extremity of cylindrical projection 58 opposite the base 56 a chamfer 59 which facilitates the entry of projection 58 into the spool valve end entry bore 22. The housing 12 may be provided at the spool valve end entry bore 22 commencing at the end face 17 of housing 12 with a beveled guide surface 23 which cooperates with the chamfer 59 on projection 58 of pilot cap 55 to facilitate alignment of and entry of the cylindrical projection 58 into the spool valve end entry bore 22.

Interposed between the boring machine 50 and the pilot assembly 35 is a housing retainer generally indicated by the numeral 65. The housing retainer 65 is fixedly mounted as by bolts 66 inserted into a base B which may be in the nature of a plate which also mounts the pilot assembly 35 and the boring machine 50. The housing retainer 65 consists in principle part in an L-shaped bracket 67 having a horizontal leg 68 through which the bolts 66 extend into the base B and a vertical, upright leg or faceplate 69. The leg 68 and plate 69 may be strengthened or rigidified to maintain their perpendicular orientation by one or more gusset plates 70.

The faceplate 69 is provided with a bore 75 which is preferably circular and concentrically aligned with the shaft 51 of boring machine 50 and the shaft 41 of the pilot assembly 35 which are themselves in exacting concentric alignment. The bore 75 is of a diameter exceeding the diameter of housing 12 at end face 17 which can therefor be inserted therein. The bore 75 terminates a portion of the distance through faceplate 69 at which point a seating insert 76 is located. The seating insert 76 has an aperture 77 and preferably has the surface 78 facing end face 17 of housing 12 coated with a material capable of minor localized deflections to facilitate clamping thereagainst of housings 12 which do not have a perfectly flat end face 17. It has been determined that a relatively high durometer urethane coating, i.e., approximately 70 durometer upwardly, provides an appropriate combination of surface deflection and rigidity for clamping. The aperture 77 is of a diameter which is greater than the diameter of the projection 58 but less than the diameter of base 56 of pilot cap 55 to permit the projection 58 and reamer 53 to be selectively extended through the faceplate 69, as described hereinafter. Thus, if the housing 12 is moved toward the faceplate 69 as viewed in FIG. 1 it cannot pass through the aperture 75 but rather the end face 17 comes into engagement with the insert 76 of the faceplate 69 as depicted in FIG. 2 of the drawings.

The use of the boring apparatus 10 to rebore a portion of a throughbore in a workpiece such as the throughbore 13 in housing 12 according to the method of the present invention is now described. Initially, the pneumatic cylinder 42 is retracted to move the pilot assembly 35 to essentially the position depicted in FIG. 1 of the drawings. A housing 12 to be rebored according to the process of the invention is manually generally aligned with the pilot assembly 35 and the nose 36 thereof is inserted into the entry bore 21, therethrough into the gear receiving bore 14, and into registry with the bushing 33 in bore 15 interiorly of the damaged portion. The enlarged cylindrical guide 37 is within the entry bore 21 of the throughbore 13 with the offset surface 38 of pilot assembly 35 engaging the shoulder 21' of housing 12. As previously indicated the guide 37 is of such a diameter as to support housing 12 and maintain it roughly positioned on pilot assembly 35 while being of a sufficiently smaller diameter such that it does not align the entry bore 21 relative to the cylindrical guide 37 of pilot member 35.

Either before or after the housing 12 is mounted on the pilot assembly 35, the pilot cap 55 is mounted on the boring machine 50. In particular, the shaft 51 is in the retracted position substantially as depicted in FIG. 1 and preferably is not rotating. The pilot cap 55 is manually aligned with the reamer 53 and the projection 57 inserted into the bore 54 to assume the configuration essentially as depicted in FIG. 1 of the drawings.

At this time, both the cylinder 42 and the cylinder assembly and motor 52 are actuated to axially drive or displace the shafts 41 and 51 toward an extended position. As seen in FIG. 1, the pilot cap 55 is driven or advanced to the right as depicted in that figure such that projection 58 passes through the aperture 77 in the faceplate 69 with the base 56 seated against faceplate 69, the pilot cap being depicted in such position in chain lines carrying the numeral 55'. The chamfer 59 of pilot cap 55 during entry initially engages with the beveled surface 23 where spool valve end entry bore 22 commences at end face 17 of housing 12 such as to guide the projection 58 into registry with the entry bore 22 of bore 15 exteriorly of the damaged portion therein. The pilot cap in the fully inserted position 55' has the chamfer 59 extending through spool valve entry bore 22 and engaging the transition to receiving bore 15. The projection 58 of pilot cap 55 maintains the housing 12 spaced a distance from seating insert 76 of faceplate 69. At this point the pilot assembly 35 and the pilot cap 55 are both aligned with portions of the spool valve receiving bore 15. The cylinders 42 and 52 continue to drive in opposition to each other which maintains the pilots 35 and 55 in position and displaces the housing to the left from the position depicted in FIG. 1. This is brought about by the fact that the offset surface 38 continues to engage the shoulder 21' to displace the housing to the left as depicted in FIG. 1. The cylinder 42 is designed to overcome the action of the cylinder 52 by virtue of the respective sizing of cylinders 42 and 52 and the respective surface areas of the housing 12 on which they operate, according to principles which will be appreciated by persons skilled in the art. The housing 12 advances to the left as depicted in FIG. 1 until it engages insert 76 of faceplate 69, since it cannot pass through the aperture 77, and reposes in the position depicted in FIG. 2. The cylinder 42 remains energized or driving such that the pressure applied to the housing 12 maintains it clamped against the insert 76 of faceplate 69 with the spool valve receiving bore 15 precisely concentrically aligned with the shafts 41 and 51 and thus the reamer 53. Thereafter the projection 58 of pilot cap 55 is retracted through the aperture 77 in insert 76 of faceplate 69 by the cylinder 52 retracting the shaft 51 which carries reamer 53 and the pilot cap 55. Once the reamer 53 and pilot cap 55 are retracted to the solid line position depicted in FIG. 1 which is a distance spaced from the faceplate 69, the pilot cap 55 may be manually removed from the reamer 53.

Once the pilot cap 55 has been removed from the reamer 53, the cylinder and motor assembly 52 is again advanced as depicted in FIG. 2, only this time the shaft 51 is also rotated so that it operates as a conventional boring machine and rebores the spool valve receiving bore 15 as is particularly depicted in FIG. 2 of the drawings. During this entire time the cylinder 42 has been maintained under pressure forcing the workpiece 12 into clamping relation with the insert 76 of faceplate 69, thus maintaining it in its perfectly aligned position. Cooling fluid may be advantageously supplied via duct 43 of pilot assembly 35 during the extent of the boring by the reamer 53. It is to be appreciated that the delivery of cooling fluid from the duct 43 of nose 36 of pilot assembly 35 tends to displace cut chips or particles which have been removed by the reamer axially rearwardly thereof away from the axially forward cutting edge of reamer 53 where the cutting of the bore 15 of housing 12 is taking place. A smooth accurate bore 15 and prolonged life of the reamer 53 are advantageous results which may be realized by employing the delivery of a cooling fluid in the manner set forth according to the arrangement of the present invention.

Once the reboring by the reamer 53 is completed to the requisite depth, the cylinder 52 is energized to retract the shaft 51 and therefore the reamer 53 from housing 12, after which the cylinder 42 is energized to retract the shaft 41. The reamer 53 returns to the position depicted in FIG. 1 and the housing 12 is similarly retracted to the original position depicted in FIG. 1. At that time the workpiece 12 may be readily manually removed from the pilot assembly 35. The boring apparatus 10 is then ready for the processing of a further workpiece with the sequence of operations set forth above being repeated.

The housing 12 is then completed by inserting a cylindrical sleeve 80 into the rebored spool valve receiving bore 15 as seen in FIG. 3 of the drawings. It is to be understood that the internal diameter of the sleeve 80 is identical to the original internal diameter of spool valve receiving bore 15 such that the housing is operative with a standard spool valve 29 employed with the housing 12. If the sleeve 80 is constructed of an appropriate metal such as steel, it has been observed that the life of a rebuilt housing can greatly exceed that of an original housing and in most instances is likely to exceed the lifetime of a motor vehicle in which the housing may subsequently be installed.

Thus it should be evident that the method and apparatus for effecting the repair of damaged bores in a workpiece by reboring herein carries out the various objects of the invention set forth hereinabove and otherwise constitutes an advantageous contribution to the art. As may be apparent to persons skilled in the art, modifications can be made to the preferred embodiment of the apparatus and the processing steps disclosed herein without departing from the spirit of the invention, the scope of the invention being limited solely by the scope of the attached claims.

I claim:

1. A method for repairing a throughbore in a workpiece formed by first and second bores where the first bore has a damaged portion, comprising the steps of mounting the workpiece on a first pilot directly engaging the first bore interiorly of the damaged portion, positioning a second pilot for engaging the first bore exteriorly of the damaged portion, driving said first and second pilots into closer positioning thereby effecting concentric alignment of the first bore in the workpiece with the first and second pilots, simultaneously moving the first and second pilots thereby clamping the workpiece against a fixed plate while maintaining the concentric alignment of the first bore with the first and second pilots, disengaging the second pilot from engagement with the first bore of the workpiece, and inserting a boring device into the first bore for reboring the damaged portion thereof while clamping the workpiece against the fixed plate.

2. The method according to claim 1, including the step of inserting a cylindrical sleeve into the first bore for reconstructing the damaged portion of the first bore to its original dimensions after the step of inserting a boring device into the first bore for reboring the damaged portion thereof.

3. The method according to claim 1, including the step of extending at least a portion of the second pilot through an aperture in the fixed plate for engaging the first bore exteriorly of the damaged portion thereof.

4. The method according to claim 3, including the step of retracting the second pilot from the aperture in the fixed plate for disengaging the first bore.

5. The method according to claim 1, including the step of temporarily attaching the second pilot to the boring device before positioning the second pilot for engaging the first bore exteriorly of the damaged portion.

6. The method according to claim 5, including the step of detaching the second pilot from the boring device after disengaging the second pilot from engagement with the first bore of the workpiece but before inserting the boring device into the first bore for reboring the damaged portion thereof.

7. The method according to claim 1, including the steps of independently driving the first pilot and the second pilot.

8. The method according to claim 7, including the step of applying a force to the workpiece with the first pilot exceeding the force applied to the workpiece by the second pilot, whereby after achieving the concentric alignment the workpiece and the second pilot are axially displaced by the first pilot until the workpiece is clamped against the fixed plate by the first pilot.

* * * * *

UNITED STATES PATENT AND TRADEMARK OFFICE
CERTIFICATE OF CORRECTION

PATENT NO. : 5,077,882
DATED : January 7, 1992
INVENTOR(S) : Dale R. Adams

It is certified that error appears in the above-identified patent and that said Letters Patent is hereby corrected as shown below:

Cover page, [57] Abstract, line 5, between "interiorly" and the comma "," insert --of the damaged portion--; line 7, between "exteriorly" and the comma "," insert --of the damaged portion--; line 8, "an axially" should read --and axially--; line 10, between "pilot," and "and" insert --whereby the first bore is concentrically aligned,--; line 11, between "(53)" and "for" insert --mounted on the cylinder and motor--; line 13, between "bore" (first occurrence) and the period "." insert --in the workpiece--.

Column 3, line 61, between "aligned" and the comma "," insert --with the pilots, a retainer for engaging the workpiece with the first bore thus concentrically aligned--.

Signed and Sealed this

Sixth Day of July, 1993

Attest:

MICHAEL K. KIRK

*Attesting Officer*   Acting Commissioner of Patents and Trademarks